US 9,398,220 B2

(12) United States Patent
Noguchi

(10) Patent No.: US 9,398,220 B2
(45) Date of Patent: Jul. 19, 2016

(54) SHAKE CORRECTION APPARATUS AND IMAGE PICKUP APPARATUS THEREOF, AND OPTICAL DEVICE MOUNTABLE ON IMAGE PICKUP APPARATUS

(71) Applicant: CANON KABUSHIKI KAISHA, Tokyo (JP)

(72) Inventor: Masaaki Noguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/573,711

(22) Filed: Dec. 17, 2014

(65) Prior Publication Data

US 2015/0181125 A1     Jun. 25, 2015

(30) Foreign Application Priority Data

Dec. 19, 2013   (JP) ................................. 2013-262415
Dec. 15, 2014   (JP) ................................. 2014-252723

(51) Int. Cl.
| H04N 5/228 | (2006.01) |
| H04N 5/225 | (2006.01) |
| H04N 5/232 | (2006.01) |
| G02B 27/64 | (2006.01) |

(52) U.S. Cl.
CPC .......... *H04N 5/23287* (2013.01); *G02B 27/646* (2013.01); *H04N 5/23258* (2013.01)

(58) Field of Classification Search
CPC .......... H04N 5/23258; H04N 5/23251; H04N 5/23264; H04N 5/2328; H04N 5/23287; H04N 5/23283; G03B 2217/005; G03B 2205/0007; G03B 2207/005; G03B 2205/0023; G03B 2205/0038; G03B 2205/0015; G02B 27/646; G02B 27/644

USPC ................................ 348/208.1–208.99, 220.1
See application file for complete search history.

(56) References Cited

U.S. PATENT DOCUMENTS

| 5,774,266 A * | 6/1998 | Otani ..................... G02B 27/64 |
| | | 359/554 |
| 2002/0112543 A1* | 8/2002 | Noguchi .................. G03B 5/00 |
| | | 73/618 |
| 2007/0183766 A1* | 8/2007 | Miyamori ................ G03B 5/02 |
| | | 396/55 |
| 2008/0187301 A1* | 8/2008 | Takahashi ................ G03B 5/00 |
| | | 396/55 |
| 2009/0003813 A1* | 1/2009 | Ohishi ............... H04N 5/23248 |
| | | 396/55 |
| 2009/0245769 A1* | 10/2009 | Uenaka .................. G03B 17/00 |
| | | 396/53 |
| 2010/0079604 A1* | 4/2010 | Washisu .................. G02B 7/08 |
| | | 348/208.4 |
| 2010/0182490 A1* | 7/2010 | Seol ........................ G02B 7/08 |
| | | 348/345 |
| 2010/0295952 A1* | 11/2010 | Oh ......................... G03B 17/00 |
| | | 348/208.4 |

(Continued)

FOREIGN PATENT DOCUMENTS

JP     2009-258389 A     11/2009

*Primary Examiner* — Chia-Wei A Chen
(74) *Attorney, Agent, or Firm* — Cowan, Liebowitz & Latman, P.C.

(57) ABSTRACT

The shake correction unit includes a shake detection unit that detects shake and a first optical correction unit and a second optical correction unit that optically perform shake correction using a shake signal output from the shake detection unit. This allows a sufficient shake-proof range to be secured and allows a stable shake-proof process to be performed under exposure even when a panning operation or large camera shake occurs under recording of a thru-image.

16 Claims, 11 Drawing Sheets

(56) References Cited

U.S. PATENT DOCUMENTS

| | | | |
|---|---|---|---|
| 2011/0115929 A1* | 5/2011 | Noguchi | G03B 5/00 348/208.4 |
| 2011/0262121 A1* | 10/2011 | Yanagisawa | G02B 7/08 396/55 |
| 2012/0154615 A1* | 6/2012 | Noguchi | H04N 5/23258 348/208.6 |
| 2012/0218428 A1* | 8/2012 | Suzuka | G02B 27/646 348/208.7 |
| 2012/0229661 A1* | 9/2012 | Sekiguchi | A61B 5/0205 348/208.4 |
| 2013/0010137 A1* | 1/2013 | Kawai | H04N 5/23258 348/208.1 |
| 2013/0063615 A1* | 3/2013 | Takeuchi | H04N 5/23258 348/208.5 |
| 2013/0342715 A1* | 12/2013 | Nakayama | H04N 5/23267 348/208.11 |
| 2014/0002679 A1* | 1/2014 | Ikeda | H04N 5/23264 348/208.5 |
| 2014/0152860 A1* | 6/2014 | Yuge | H04N 5/23287 348/208.11 |
| 2015/0110481 A1* | 4/2015 | Suzuka | G02B 27/646 396/55 |

* cited by examiner

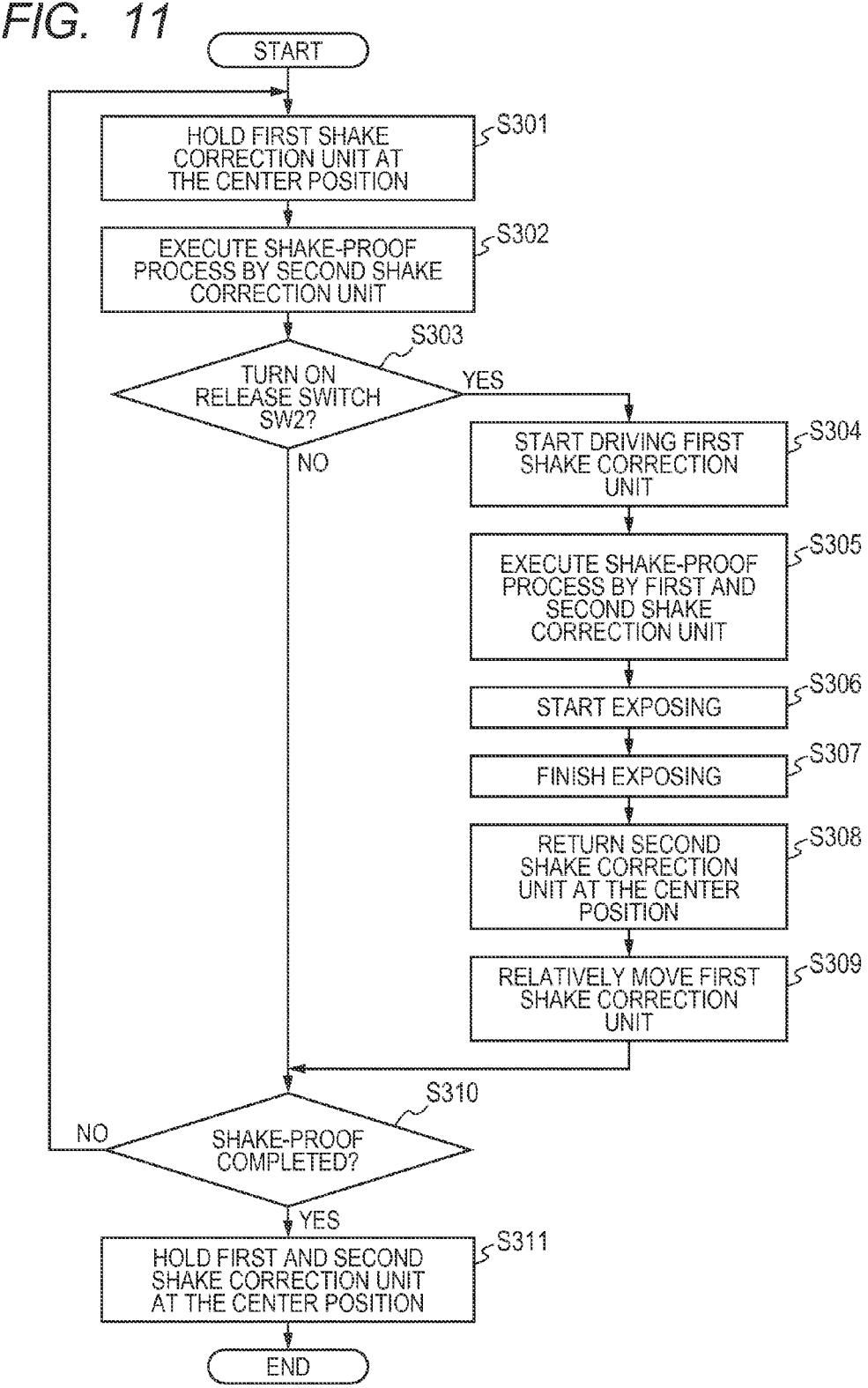

SHAKE CORRECTION APPARATUS AND IMAGE PICKUP APPARATUS THEREOF, AND OPTICAL DEVICE MOUNTABLE ON IMAGE PICKUP APPARATUS

BACKGROUND OF THE INVENTION

1. Field of the Invention

The present invention relates to a shake correction apparatus and an image pickup apparatus provided therewith, and an optical device mountable on the image pickup apparatus.

2. Description of the Related Art

A shake correction apparatus mounted on a digital camera or the like reduces influences of camera shake that occurs at the time of photographing by driving an optical member or a movable lens-barrel that holds an image sensor in two directions (yaw direction and pitch direction) within a plane orthogonal to an optical axis.

Japanese Patent Application Laid-Open No. 2009-258389 discloses a shake correction apparatus provided with a first movable lens-barrel that holds a first correction member and a second movable lens-barrel that holds a second correction member, the two correction members being respectively located before and after a fixing member and the respective movable lens-barrels being drivable independently of each other. This allows the shake correction apparatus to increase the number of correctable angles.

A prior art disclosed in Japanese Patent Application Laid-Open No. 2009-258389 passes a current through two shake correction units using lenses with different positive and negative powers so that the shake correction units have opposite polarities with respect to a common driving magnet. Thus, since this provides a mechanism that reduces the amount of drive by simultaneously driving the shake correction units in opposite directions, both shake correction units are always driven during shake correction. For this reason, in the case where a panning operation or large camera shake occurs under recording of a thru-image, causing the image to move close to a movable end of shake correction, there is a problem that the shake-proof range under exposure cannot be sufficiently secured.

SUMMARY OF THE INVENTION

It is an object of the present invention to secure a sufficient shake correction region under recording of a thru-image and under exposure for a still image in an image pickup apparatus provided with first and second shake correction units that drive first and second shake correction (image moving) members.

It is another object of the present invention to drive only the first shake correction member under recording of a thru-image, hold the second shake correction member in a predetermined position within a shake correction movable range, hold the first shake correction member at an exposing starting position under exposure for a still image recording and drive only the second shake correction member.

It is a further object of the present invention to provide a shake correction apparatus including a shake detection unit that detects a shake and a first optical correction unit and a second optical correction unit that optically perform shake correction using a shake signal output from the shake detection unit.

It is a still further object of the present invention to provide an image pickup apparatus provided with a shake correction apparatus including a shake detection unit that detects a shake and a first optical correction unit and a second optical correction unit that optically perform shake correction using a shake signal output from the shake detection unit.

It is a still further object of the present invention to provide an optical device mountable on an image pickup apparatus provided with a shake correction apparatus including a shake detection unit that detects a shake and a first optical correction unit and a second optical correction unit that optically perform shake correction using a shake signal output from the shake detection unit.

It is a still further object of the present invention to provide a shake correction method for an image pickup apparatus, the image pickup apparatus including a shake detection unit, and a first optical correction unit and a second optical correction unit, the shake correction method including detecting a shake using the shake detection unit, limiting a correction range of shake correction using the second optical correction unit, and optically performing shake correction using the signal detected by the shake detection unit using the first optical correction unit or optically performing shake correction using the signal detected by the shake detection unit using the second optical correction unit.

According to the present invention, it is possible to secure a sufficient shake correction movable region under recording of a thru-image and under exposure for recording of a still image respectively. It is possible to provide a shake correction apparatus capable of performing stable shake correction even after a panning operation or large camera shake occurs.

Further features of the present invention will become apparent from the following description of exemplary embodiments with reference to the attached drawings.

BRIEF DESCRIPTION OF THE DRAWINGS

FIG. 11 is a flowchart when a still image is obtained according to Embodiment 3 of the present invention.

DESCRIPTION OF THE EMBODIMENTS

Preferred embodiments of the present invention will now be described in detail in accordance with the accompanying drawings.

[Embodiment 1]

Figure 1:
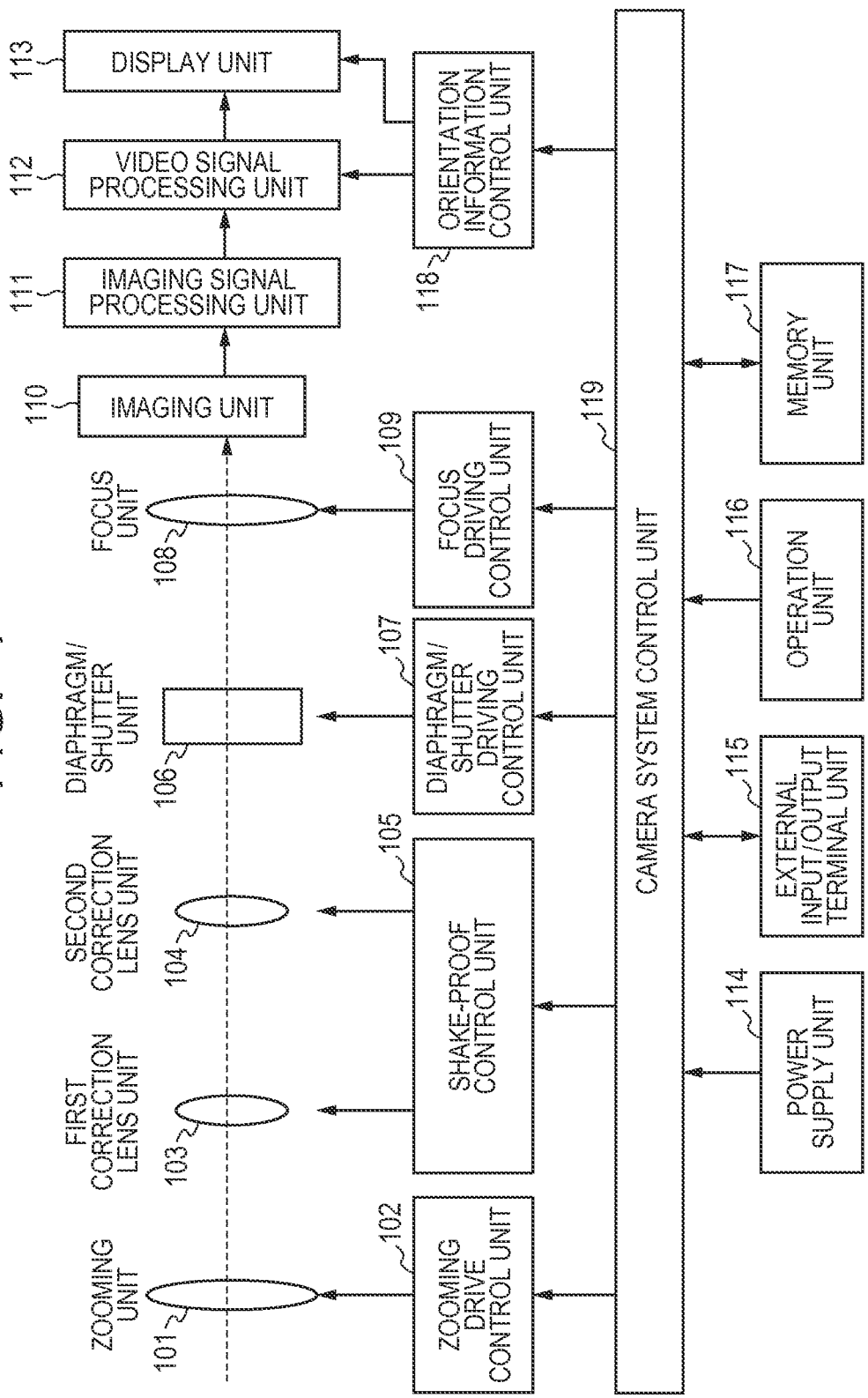
FIG. 1 is a configuration diagram illustrating a barrel of a shake correction apparatus according to each embodiment of the present invention.

FIG. 1 is a block diagram illustrating a configuration example of a digital still camera as an example of an image pickup apparatus according to one embodiment of the present invention.

The image pickup apparatus is provided with a zooming unit 101 as an image taking optical system, a zooming drive control unit 102 as a shake correction apparatus and a shake-proof control unit 105. The zooming unit 101 includes a zoom lens that changes the magnifying power. In the present embodiment, the zooming unit 101 includes two correction lens units: a first correction lens unit 103 as a first shake correction unit (a first optical correction unit) and a second correction lens unit 104 as a second shake correction unit (a second optical correction unit). The first correction lens unit 103 and the second correction lens unit 104 can be driven independently of each other. The zooming drive control unit 102 performs drive control on the zooming unit 101. The correction lens (shift lens) unit includes a correction lens which is movable in a direction perpendicular to an optical axis and the correction lens includes a circular movable region in a predetermined size centered on, for example, the optical axis.

The shake-proof control unit 105 detects a shake of a digital still camera 100 using, for example, an angular velocity sensor or acceleration sensor and controls the drive of the correction lens so as to correct a shake of a captured image caused by camera shake. The shake-proof control unit 105 controls the drive of the first correction lens unit and the second correction lens unit. The way the shake-proof control unit 105 drives the correction lens (drive range, drive pattern of the correction lens or the like) will be described later.

Control is possible according to camera shake correction parameters set by a camera system control unit 119 in the shake-proof control unit 105. Furthermore, the shake-proof control unit 105 may prepare a parameter set corresponding to a plurality of feasible camera shake correction functions and the camera system control unit 119 may set identification information on a camera shake correction function to be enabled or disabled by the shake-proof control unit 105, and thereby control operation of the shake-proof control unit 105.

A diaphragm/shutter unit 106 includes a mechanical shutter that also serves as a diaphragm, for example.

A diaphragm/shutter driving control unit 107 controls the drive of the diaphragm/shutter unit 106.

A focus unit 108 includes a lens that adjusts the focus (focus lens). The focus driving control unit 109 controls the drive of the focus unit 108. The zooming unit 101, the correction lens units 103 and 104, the diaphragm/shutter unit 106 and the focus unit 108 are arranged in the photographing lens which is photographing optical unit. The photographing lens which is a photographing optical unit causes an object image to be imaged on an imaging plane as an optical image. The photographing lens which is a photographing optical unit may be of a replacement type or a fixed type.

An imaging unit 110 includes an image sensor 201 and photoelectrically converts an optical image of an object image imaged by the photographing lens of a photographing optical system to an electric signal. An imaging signal processing unit 111 converts the electric signal output from the imaging unit 110 to a video signal. A video signal processing unit 112 processes the video signal output from the imaging signal processing unit 111 according to the use. A display unit 113 displays a live view image based on the signal output from the video signal processing unit 112 as required and functions as an EVF. In the present embodiment, the live view display is mainly used under recording of a thru-image, but without being limited to this, an optical finder (not shown) may be used instead of performing a live display under recording of a thru-image.

A power supply unit 114 supplies power to the whole digital still camera 100 according to the use. An external input/output terminal unit 115 inputs/outputs a communication signal and a video signal to/from an outside apparatus or a network or the like. An operation unit 116 is an input device group including buttons, keys and touch panel or the like for the user to input various instructions to the digital still camera 100. A memory unit 117 stores various types of data such as video information.

An orientation information control unit 118 determines the orientation (longitudinal position or lateral position) of the image pickup apparatus and provides orientation information to the display unit 113 and the video signal processing unit 112. The camera system control unit 119 controls the entire digital still camera 100. The camera system control unit 119 may be a programmable processor such as a CPU. For example, the camera system control unit 119 executes a control program stored in the memory unit 117, controls the respective units and thereby implements various functions of the digital still camera 100.

At least one of the imaging signal processing unit 111 and the video signal processing unit 112 may be implemented on a software basis by the camera system control unit 119. Alternatively, at least some of the functions implemented by the camera system control unit 119 may be implemented by hardware such as an ASIC or electronic circuit.

Next, main operations of the digital still camera 100 will be described.

The operation unit 116 includes a shake-proof switch for setting whether to enable or disable a shake correction function (shake-proof function). When a mode in which the shake correction function is enabled (shake correction mode or shake-proof mode) is selected by the shake-proof switch, the camera system control unit 119 instructs the shake-proof control unit 105 to start a shake-proof operation. The shake-proof control unit 105 that has been instructed to start the shake-proof operation performs the shake-proof operation until completion of the shake-proof operation is instructed.

The operation unit 116 also includes a photographing mode selection switch to set a photographing mode. As the photographing mode, it is possible to select a still image photographing mode or a moving image photographing mode. It is possible to change the operation condition of a drive member (e.g., actuator) of the correction lens depending on the set photographing mode.

Furthermore, the operation unit 116 includes a shutter release button constructed such that a first switch (SW1) and a second switch (SW2) are turned on in that order according to the pushing depth. The shutter release button is structured such that the switch SW1 is turned on when the shutter release button is pushed approximately half, and the switch SW2 is turned on when the shutter release button is pushed to the end.

When the switch SW1 is turned on, the focus driving control unit 109 acquires an AF evaluation value from the image processed by the imaging signal processing unit 111 or the video signal processing unit 112, drives the focus unit 108 and thereby performs automatic focus detection in a contrast scheme. Alternatively, focus detection in a phase difference detection scheme using an external measurement sensor or the like may also be performed. The camera system control unit 119 determines a photographing condition for acquiring an appropriate exposure amount from the image processed by the imaging signal processing unit 111 or the video signal processing unit 112. When the switch SW2 is turned on, the diaphragm/shutter driving control unit 107 drives the diaphragm/shutter unit 106 according to the determined photographing condition, causes the imaging unit 110 to perform exposure and outputs an electric signal converted by the imaging unit 110 from the optical image. After that, the imaging signal processing unit 111 performs AD conversion processing, color interpolation processing, white balance adjustment processing, gamma correction processing or the like, and image data is stored in the memory unit 117.

Furthermore, the operation unit 116 includes a moving image recording switch. When the moving image recording switch is pressed down, recording of the moving image in the memory unit 117 starts and when the moving image recording switch is pressed down again during recording, recording of the moving image is finished. By pressing a still image photographing release switch under exposure for a moving image, it is possible to photograph a still image under exposure for a moving image (hereinafter, referred to as "still image photographing under exposure for a moving image"). The operation unit 116 also includes a playback mode selection switch that allows a playback mode to be selected and in the playback mode, the shake-proof process is stopped from the camera system control unit 119 via the shake-proof control unit 105.

The operation unit 116 includes a variable power switch that changes the zooming variable power of the photographing lens.

When a power change instruction is input by the variable power switch, the zooming drive control unit 102 which has received the instruction via the camera system control unit 119 drives the zooming unit 101 in the instructed direction. Along with that, the focus driving control unit 109 drives the focus unit 108 to perform focus adjustment based on image information transmitted from the imaging unit 110 processed in the imaging signal processing unit 111 and the video signal processing unit 112.

Figure 2:
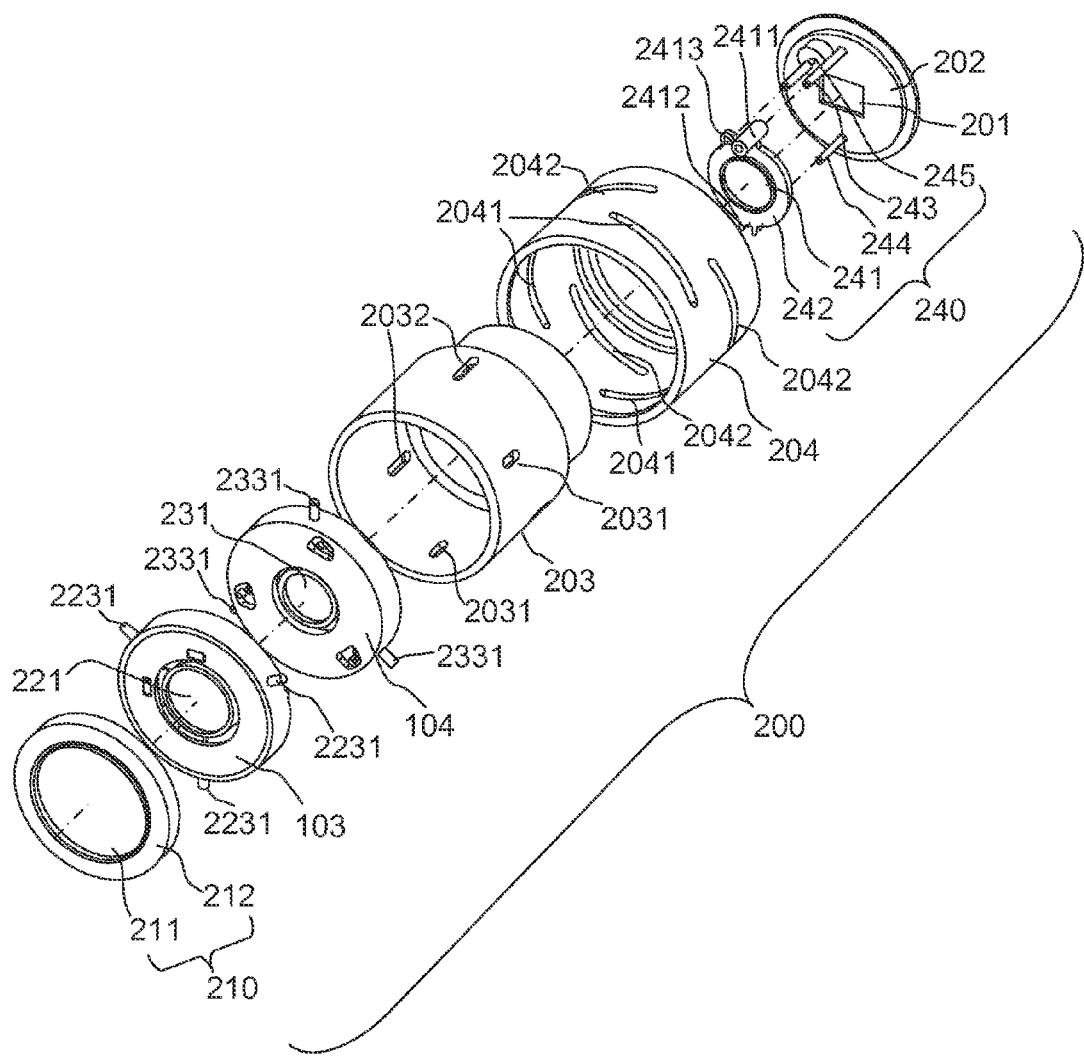
FIG. 2 is an exploded perspective view of the barrel of the shake correction apparatus according to each embodiment of the present invention.

FIG. 2 is an exploded perspective view of a barrel part of the image pickup apparatus provided with the shake correction apparatus proposed in the present embodiment. A barrel 200 is constructed of the image sensor 201, an image sensor holder 202, a fixed cylinder 203, a cam cylinder 204, and lens units of a first-group 210, a second-group 103, a third-group 104 and a fourth-group 240. The lens unit of the first-group 210 is constructed of a first-group lens 211 and a first-group lens holder 212. The lens unit of the second-group 103 is constructed of a first correction lens unit which is a first shake correction unit. The lens unit of the third-group 104 is a second correction lens unit which is a second shake correction unit. The lens unit of the second-group 103 causes a relative position of the image sensor 201 to change within its imaging plane with respect to an object image. Similarly, the lens unit of the third-group 104 also causes a relative position of the image sensor 201 to change within its imaging plane with respect to an object image.

The fourth-group lens unit 240 is constructed of a fourth-group lens 241, a fourth-group lens holder 242, a main bar 243, a subbar 244 and a stepping motor 245. The first-group lens 211, a second-group lens 221, a third-group lens 231 and the fourth-group lens 241 form a photographing optical system of the barrel 200 of the image pickup apparatus.

The image sensor 201 is an element capable of recording an image formed on an imaging plane as an electric signal obtained by photoelectrically converting an object image. For example, a CCD, C-MOS element or photographic film corresponds to this.

The image sensor holder 202 is a disk-shaped member capable of fixing the image sensor 201. The image sensor holder 202 can fix the main bar 242, the subbar 243 and the stepping motor 244 that make up the fourth-group.

The fixed cylinder 203 is formed in a cylindrical shape and can fix the image sensor holder 202 at one end thereof. The fixed cylinder 203 can also hold the first-group lens holder 212 making up the first-group to an inner diameter part at the other end thereof. The fixed cylinder 203 can also pivotally support the cam cylinder 204 on an outermost peripheral part.

The fixed cylinder 203 is provided with first linear grooves 2031 and second linear grooves 2032. The first linear grooves 2031 are rectilinear grooves that extend in the optical axis direction and are arranged at three uniformly spaced locations around the optical axis. The first linear grooves 2031 engage with second-group followers 2231 provided in a second-group fixed base plate 223 and support the second-group 103 so as to be movable in the optical axis direction.

The second linear grooves 2032 are rectilinear grooves that extend in the optical axis direction and arranged at three uniformly spaced locations around the optical axis. The second linear grooves 2032 engage with third-group followers 2331 provided in the third-group fixed base plate and support the third-group 104 so as to be movable in the optical axis direction.

The cam cylinder 204 is formed in a cylindrical shape and pivotally supported on an outer circumference of the fixed cylinder 203 around the optical axis as its central axis. The cam cylinder 204 is provided with first cam grooves 2041 and second cam grooves 2042.

The first cam grooves 2041 engage with the second-group followers 2231 provided in the second-group fixed base plate 223 and allow the second-group 103 to move forward or backward in the optical axis direction according to the rotation of the cam cylinder 204.

The second cam grooves 2042 engage with the third-group followers 2331 provided in the third-group fixed base plate and allow the third-group 104 to move forward or backward in the optical axis direction according to the rotation of the cam cylinder 204. The rotational position of the cam cylinder 204 can be detected by a detection unit (not shown).

The first-group lens holder 212 can hold the first-group lens 211 and is fixed to the fixed cylinder 203. The fourth-group lens holder 242 can hold the fourth-group lens 241 and includes a sleeve portion, a rotation stopper groove and a rack portion. The sleeve portion engages with the main bar 243 that is fixed to the image sensor holder 204 and extends in the optical axis direction, and thereby holds the fourth-group lens holder 242 so as to be movable forward or backward in the optical axis direction. The rotation stopper groove engages with the subbar 244 that is fixed to the image sensor holder 204 and extends in the optical axis direction, and thereby regulates the rotation of the fourth-group lens holder 242 around the main bar 243. The rack engages with a lead screw provided on the rotating shaft of the stepping motor 245, and can thereby derive the driving force of the stepping motor 245. By rotating the stepping motor 245 by a predetermined amount, it is possible to cause the fourth-group lens holder 242 to move forward or backward by a predetermined amount in the optical axis direction.

That is, in the present photographing optical system, it is possible to change the magnifying power of the photographing optical system to a desired value by operating the cam cylinder 204 and moving the positions of the second-group lens 221 and the third-group lens 231 in the optical axis direction.

The cam cylinder 204 may be operated manually by the user or by a specific motor such as a stepping motor or ultrasound motor for rotation of the cam cylinder 204. The focus of the photographing optical system may be adjusted by rotating the stepping motor 244 and moving the position of the fourth-group lens 241 in the optical axis direction.

Figure 3:
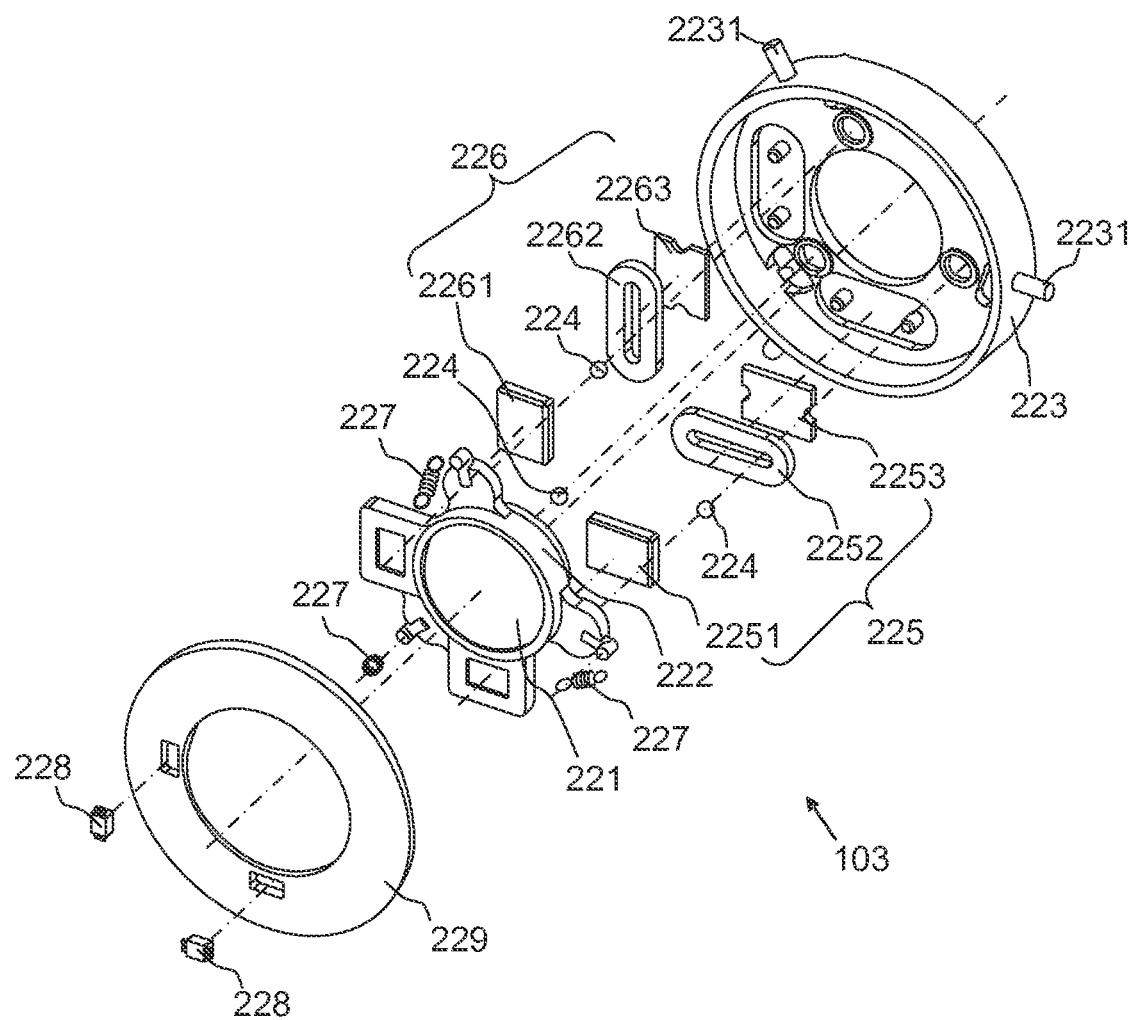
FIG. 3 is an exploded perspective view of a first correction lens unit according to each embodiment of the present invention.

FIG. 3 is an exploded perspective view of the first correction lens unit. The second-group lens unit 103 is provided with the second-group lens 221, a second-group movable lens-barrel 222, a second-group fixed base plate 223 and rolling balls 224. The first correction lens unit is also constructed of a first second-group electromagnetic drive unit 225, a second-group electromagnetic drive unit 226, urging springs 227, second-group position sensors 228 and a second-group sensor holder 229.

The first second-group electromagnetic drive unit 225 is constructed of a first second-group magnet 2251, a first second-group coil 2252 and a first second-group yoke 2253. The second second-group electromagnetic drive unit 226 is constructed of a second second-group magnet 2261, a second second-group coil 2262 and a second second-group yoke 2263.

The second-group lens 221 is a first correction optical member whose optical axis can be decentered. The second-group lens 221 is drive-controlled by a drive control unit which will be described later so as to perform a shake correction operation of moving the optical image which has passed through the photographing optical system, and can thereby secure stability of the image on the imaging plane. Note that the present embodiment uses a correction lens as the correction optical system, but stability of the image on the imaging plane can also be secured by driving the image sensor such as a CCD with respect to the photographing optical system. In this case, the image sensor becomes the correction optical system.

The second-group movable lens-barrel 222 is a first movable part that holds the correction lens 221 in its center opening. The second-group movable lens-barrel 222 can hold the first second-group magnet 2251 and the second magnet 2252. The second-group movable lens-barrel 222 includes three rolling ball bearings and is pivotally supported by the rolling balls 224 so as to be movable within the plane orthogonal to the optical axis. The second-group movable lens-barrel 222 also includes three spring hooks and can thereby hold one end of the urging springs 227.

The second-group fixed base plate 223 is a first fixing member formed in a cylindrical shape. The second-group fixed base plate 223 has second-group followers 2231 at three locations on the outer peripheral part and has a total of three second-group followers. With the movable lens-barrel 222 fitted in its center opening, the second-group fixed base plate 223 can limit the movable amount of the second-group movable lens-barrel 222.

The second-group fixed base plate 223 can hold the first coil 2252 and the first yoke 2253 at a location facing a magnetized plane of the first magnet 2251. The second-group fixed base plate 223 can further hold the second coil 2262 and the second yoke 2263 at a location facing a magnetized plane of the second magnet 2261. The second-group fixed base plate 223 has three rolling ball bearings and can support the second-group movable lens-barrel 222 so as to be movable within the plane orthogonal to the optical axis via the rolling balls 224. The fixed base plate 223 has three spring hooks, and can thereby hold one end of the urging springs 227.

The first second-group electromagnetic drive unit 225 is a publicly known voice coil motor. When a current is made to flow into the first second-group coil 2252 attached to the second-group fixed base plate 223, a Lorentz force is generated on the first second-group magnet 2251 fixed to the second-group movable lens-barrel 222, and it is thereby possible to drive the second-group movable lens-barrel 222. In the present embodiment, the first second-group magnet 2251 and the first second-group yoke 2253 are arranged so as to sandwich the first second-group coil 2252, and it is thereby possible to efficiently convert a magnetic flux generated by the first second-group magnet 2251 to a drive force. The first second-group yoke 2253 can reduce the amount of the magnetic flux of the first second-group magnet 2251 leaking out to far distant areas.

The second-group electromagnetic drive unit 226 includes a voice coil motor similar to that of the first second-group electromagnetic drive unit 225 which is placed, turned by 90°, and so detailed description thereof will be omitted.

The urging spring 227 is a tensile spring that generates an urging force proportional to the amount of deformation. With one end fixed to the second-group movable lens-barrel 222 and the other end fixed to the second-group fixed base plate 223, an urging force is generated therebetween. The rolling balls 224 are held by this urging force and the rolling balls 224 can keep the second-group fixed base plate 223 and the second-group movable lens-barrel 222 in contact with each other.

The second-group position sensor 228 is a magnetic sensor as a current position detection unit using hole elements that read the magnetic fluxes of the first magnet 2251 and the second magnet 2252. The second-group position sensor 228 detects movement within a plane of the second-group movable lens-barrel 222 from a variation of output thereof. It is possible to grasp the current position of the first correction lens unit which is a first shake correction unit or more specifically, the current positions of the lenses in the first correction lens unit. Similarly, movement within a plane of the second-group movable lens-barrel 222 is detected from a variation of output thereof. It is also possible to grasp the current position of the second correction lens unit which is a second shake correction unit or more specifically, the current positions of the lenses in the second correction lens unit. The second-group sensor holder 229 is formed in a substantially disk shape and fixed to the second-group fixed base plate 223. Two second-group position sensors 228 can be held at positions facing the first second-group magnet 2251 and the second second-group magnet 2261. The second-group movable lens-barrel 222 can be accommodated in the inner space formed in the second-group fixed base plate 223. Even when an impact force is applied to the shake correction apparatus or an orientation difference occurs, this prevents inner parts from dropping.

This configuration allows the second-group lens 221 to move to any given position on the plane orthogonal to the optical axis in the first correction lens unit 103. The second-group movable lens-barrel 222 that holds the second-group lens 221 is held by the rolling balls 224 so as to be movable with respect to the second-group fixed base plate 223. In this case, since the urging springs 227 generate an urging force with which the second-group fixed base plate 223 and the second-group movable lens-barrel 222 sandwich the rolling balls 224, the position in the optical axis direction of the second-group movable lens-barrel 222 with respect to the second-group fixed base plate 223 is stably determined. By passing a predetermined current through the first second-group coil 2252 and the second second-group coil 2262, it is possible to cause a drive force to act on the movable lens-barrel 222 and cause the second-group lens 221 to move to a predetermined position within the plane. The lens unit of the third-group 104 is a second shake correction unit and has a configuration similar to that of the second-group lens unit 103 which is a first shake correction unit, and so detailed description thereof is omitted.

Figure 4:
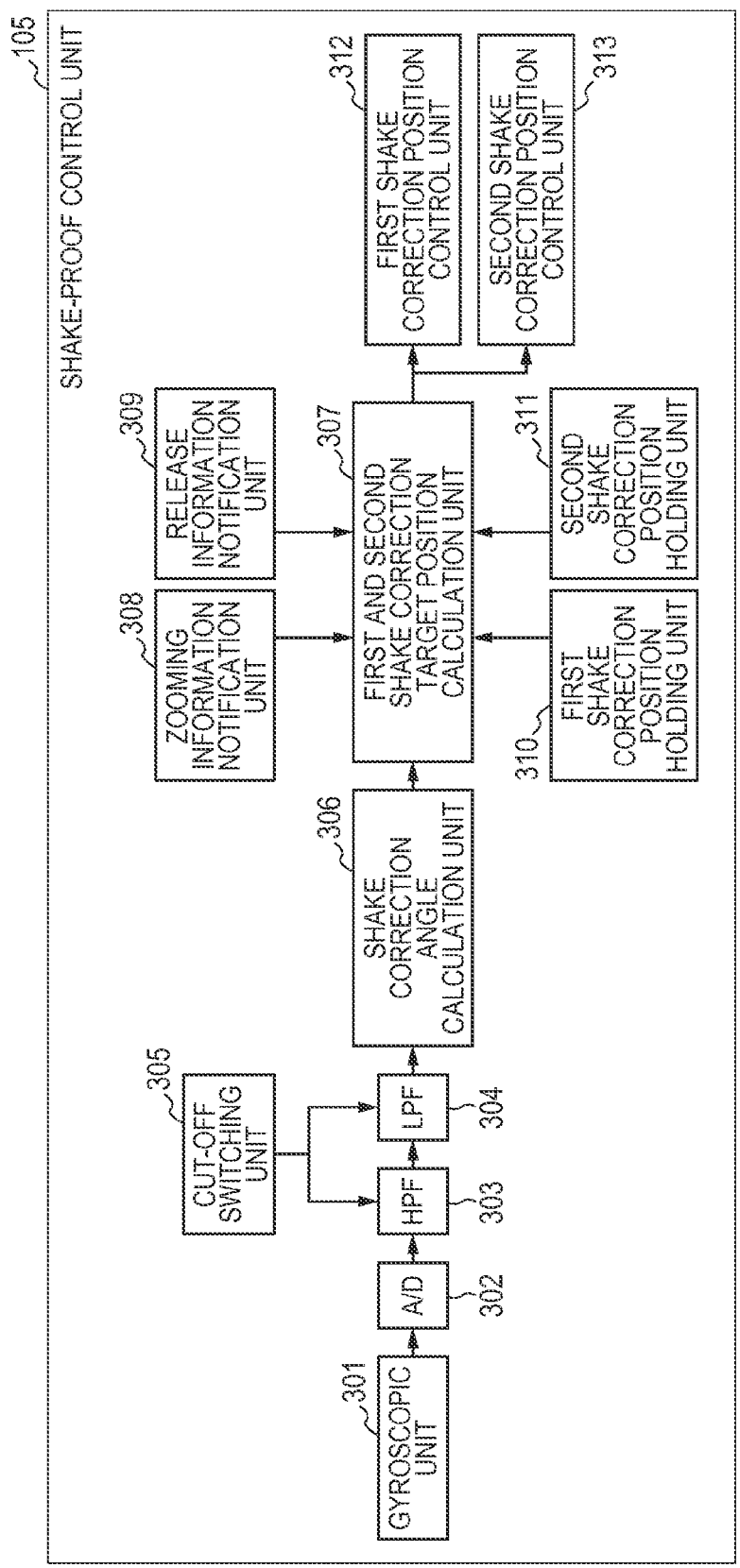
FIG. 4 is a block diagram describing an internal configuration of the shake-proof control unit according to each embodiment of the present invention.

FIG. 4 illustrates a block diagram showing a configuration of the shake-proof control unit. A shake added to the shake correction apparatus is detected by a shake detection unit, that is, a gyroscopic unit 301 which is a shake-proof control angular velocity sensor and detected as an output signal of the gyroscopic unit 301. The output signal of the gyroscopic unit 301 is input to an AD converter 302 and converted to a digital signal. The signal output from the AD converter 302 is input to a high pass filter (hereinafter, referred to as "HPF") 303 first and then input to a low pass filter (hereinafter, referred to as "LPF") 304, and an angular velocity signal is stripped of a DC component and output as an angle signal. When the angular velocity sensor uses a digital communication scheme such as SPI, the AD converter 302 is not necessary.

The angle signal is input to the cut-off frequency switching unit 305 of the HPF and LPF and used for panning control that suppresses correction output according to the magnitude of the shake correction angle and the shift lens position or the like.

The output signal of the LPF 304 is input to a shake correction angle calculation unit 306 and the output thereof is input to a first and second shake correction target position calculation unit 307 which is a target position calculation unit, and angles to be corrected are calculated.

The correction angle calculated by the shake correction angle calculation unit 306 is converted to required amounts of drive in the first and second shake correction target position calculation unit 307 which is a target position calculation unit according to information of the zooming information notification unit 308. The respective target positions of the first shake correction unit and the second shake correction unit according to shakes detected by the gyroscopic unit 301 are thereby calculated.

The first and second shake correction target position calculation unit 307 receives release information from the operation unit 116 via a release information notification unit 309, calculates a target position to drive the first shake correction unit under recording of a thru-image or calculates a target position to drive the second correction unit under exposure.

A first shake correction position holding unit 310 and a second shake correction position holding unit 311 store holding position information of the first shake correction unit under exposure and holding position information of the second shake correction unit under recording of a thru-image as position data respectively. Details of switching of drive and position holding of the correction unit according to release information will be described later.

After being subjected to a series of processes, the angular velocity signal input to the shake-proof control unit is output as a correction position control signal and input to a first shake correction position control unit 312 and a second shake correction position control unit 313 which are feedback control units. The first shake correction position control unit 312 and the second shake correction position control unit 313 perform feedback control using mainly PID control so as to follow the respective target positions. That is, the first shake correction position control unit 312 and the second shake correction position control unit 313 which are feedback control units perform feedback control so that the current position detected by the second-group position sensor 228 converges to the target position. That is, the feedback control unit performs feedback control so that the detected current position converges to the target positions calculated by the first and second shake correction target position calculation unit 307 which is the target position calculation unit. Hereinafter, shake-proof operation realized by feedback control will be described.

Figure 5:
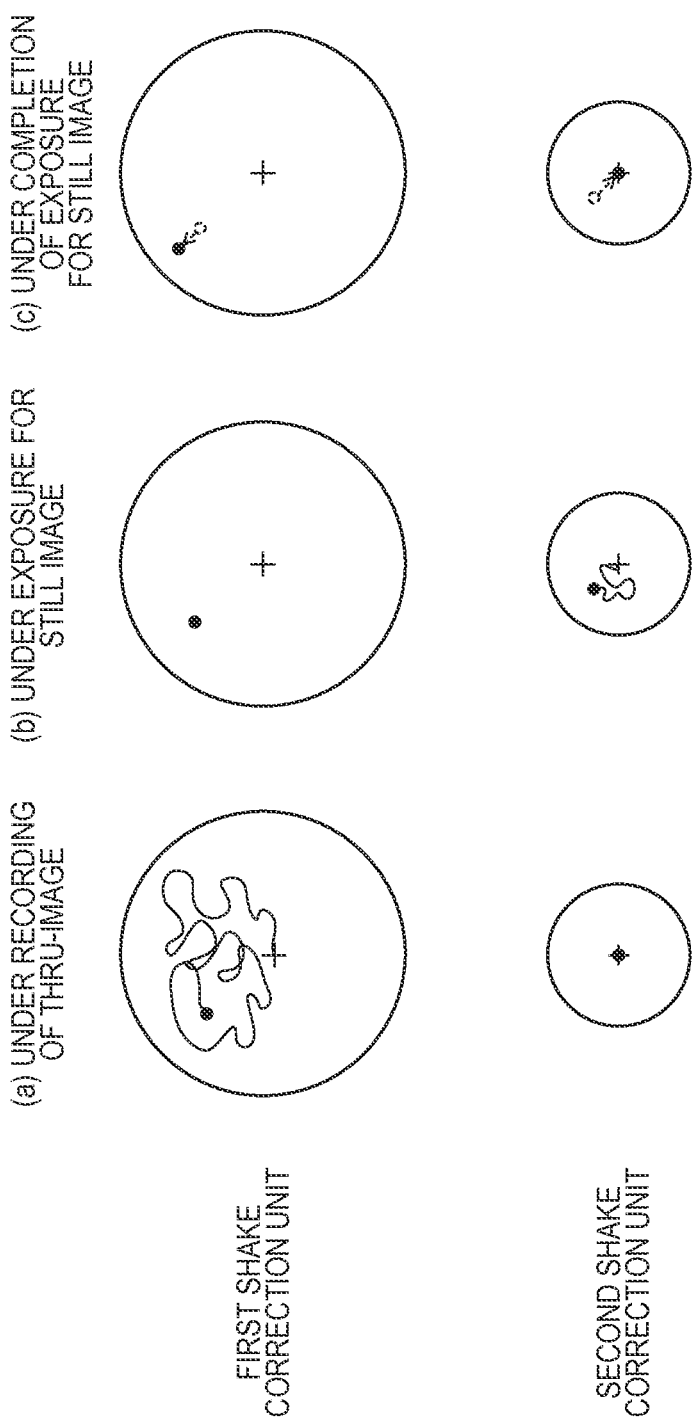
FIG. 5 illustrates operations of a first shake correction unit and a second shake correction unit when a still image is obtained according to each embodiment of the present invention. (a) of FIG. 5 illustrates states of the first shake correction unit and the second shake correction unit under recording of a thru-image. (b) of FIG. 5 illustrates a state of the shake correction unit under exposure for recording of a still image. (c) of FIG. 5 illustrates states of the first shake correction unit and the second shake correction unit under completion of exposure for a still image.

FIG. 5 illustrates a conceptual diagram of shake-proof operation through feedback control when using two correction units: the first shake correction unit and the second shake correction unit. The present embodiment has a feature of switching the drive of the first shake correction unit and the second shake correction unit according to the recording state of a still image or moving image of the image pickup apparatus. Details thereof will be described below.

In feedback control, it is determined whether to drive at least one or both of the first shake correction unit and the second shake correction unit according to information as to which is applicable: under recording of a thru-image or under exposure, notified from the release information notification unit 309. Accordingly, the shake correction angle to be calculated by the shake correction angle calculation unit 306 is calculated as follows.

In (a) of FIG. 5, it is illustrated, states of the first shake correction unit and the second shake correction unit under recording of a thru-image. Under recording of a thru-image, shake-proof operation is performed by driving only the first shake correction unit. That is, all shake correction angles calculated by the shake correction angle calculation unit 306 are calculated as the amounts of drive of the first shake correction unit by the first and second shake correction target position calculation unit 307 as target positions. Under recording of a thru-image, the second shake correction unit is held at a center position of the movable range which is a predetermined position. When both the first shake correction unit and the second shake correction unit are located at the center position, they are assumed to be located at the center of the optical axis. Alternatively, the position holding position of the second shake correction unit may be deviated from the center of the optical axis to adjust brightness shading or resolution or the like. The position information of the second shake correction unit in this case is stored as position data in the second shake correction position holding unit 311.

In (b) of FIG. 5, it is illustrated, a state of the shake correction unit under exposure for recording of a still image. The moment at which SW2 is notified from the release information notification unit 309 and an exposure starts, the first shake correction unit is stopped and holds the position in the place where it is stopped. The shake correction angle calculated by the shake correction angle calculation unit 306 is calculated by the second shake correction target position calculation unit 307 as the target position, using the moment at which the SW2 is pressed as a reference, as the amount of drive of the second shake correction unit so as to correct only the correction angle from the reference. The stop position of the first shake correction unit at this time is stored in the first shake correction position holding unit 310 as position data.

Figure 6:
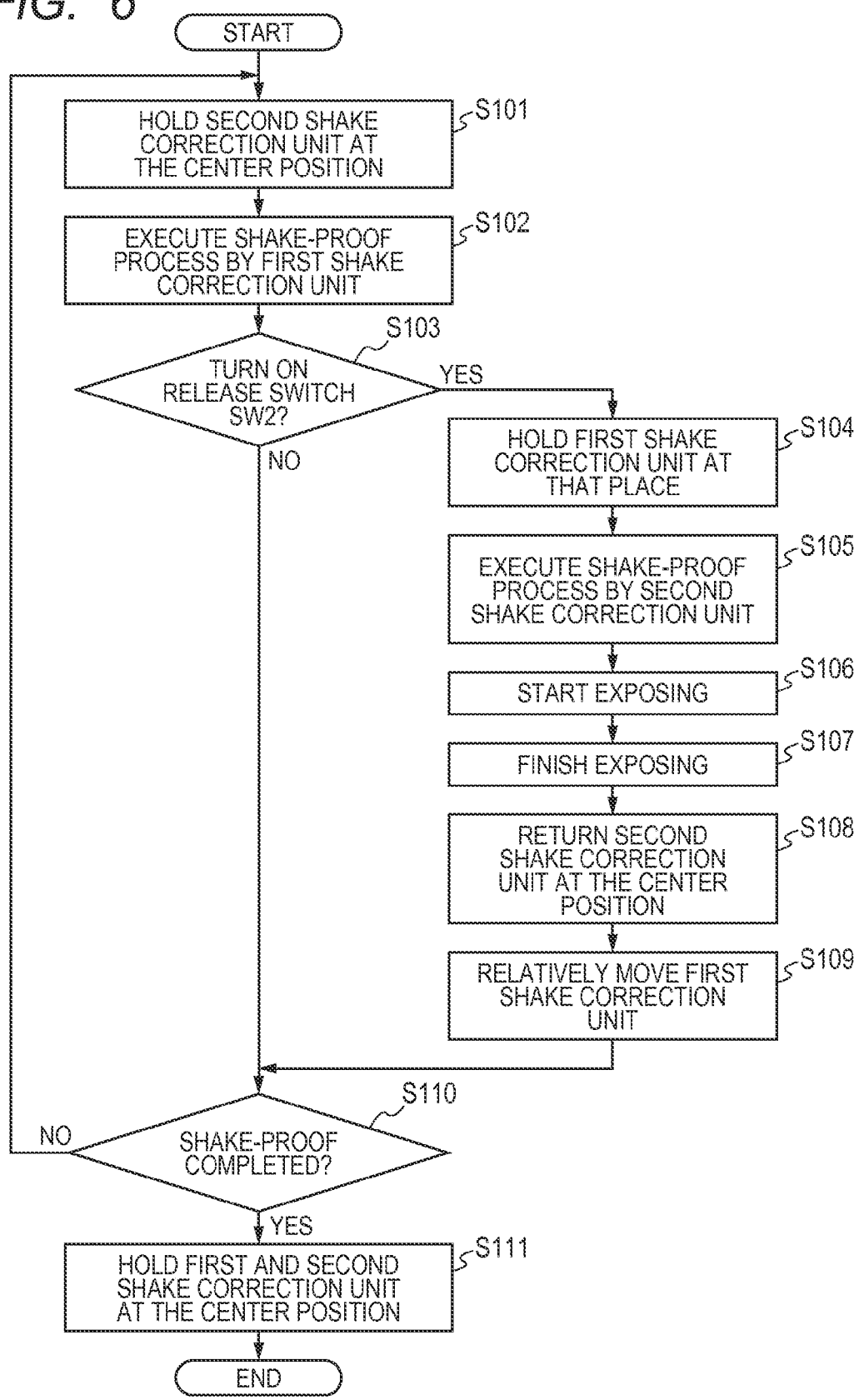
FIG. 6 is a flowchart when taking a still image according to each embodiment of the present invention.

In (c) of FIG. 5, it is illustrated, states of the first shake correction unit and the second shake correction unit under completion of exposure for a still image. After completion of exposure, the second shake correction unit returns the center position for the next exposure for a still image. The angle of view is deviated when the second shake correction unit moves from the position of completion of exposure to the center position. Thus, the first shake correction unit is moved in a direction in which the deviation of the angle of view is canceled from the stop position at which the first shake correction unit is held by the first shake correction position holding unit 310. At the same time, the shake correction angle calculated by the shake correction angle calculation unit 306 is switched based on the reference defined in (b) of FIG. 5 by driving the first shake correction unit so as to hold the first shake correction unit at the position at the start of exposure. These processes are shown in a flowchart in FIG. 6.

That is, in a state after the camera is started, when camera shake correction is on and under recording of a thru-image, the second shake correction unit is held at the center position (S101). Shake-proof control is performed by only the first shake correction unit (S102). Next, it is determined whether the release switch SW2 has been pressed or not (S103). When the SW2 has not been pressed, the flow proceeds to S110 in a thru-image state while performing shake correction by the first shake correction unit. On the other hand, when the SW2 has been pressed and photographing of a still image has been started, the first shake correction unit is held or fixed at that place at the same time as the SW2 is pressed (S104). Under recording of a thru-image, the second shake correction unit which has been fixed at the center performs shake-proof operation (S105). An exposure is started (S106), and after a lapse of a predetermined time, the exposure is completed and photographing of a still image is processed (S107). In this way, the second shake correction unit is fixed at the center before an exposure and is subjected to shake-proof process simultaneously with the start of exposure, and it is thereby possible to secure a sufficient shake-proof movable range under exposure.

Upon completion of exposure, the second shake correction unit is returned to the center position at which the second shake correction unit has been held under recording of a thru-image (S108), and the second shake correction unit is returned at the same time, and the first shake correction unit is thereby moved so as to cancel the changed angle of view (S109).

Thus, by moving the first camera shake correction unit so as to cancel the deviation of the angle of view, it is possible to prevent an unnatural deviation of the angle of view after completion of exposure and prepare for the next photographing at the same time. After still image photographing is completed, the flow returns to the thru-image state and it is determined whether or not to finish the shake-proof process (S110), and if the shake-proof process is not finished, the flow is returned to the state in S101. If the shake-proof process is finished, both the first shake correction unit and the second shake correction unit are returned to the center position and held in that state.

As described above, by switching the drive of the first and second shake correction units under recording of a thru-image and under exposure of a still image, it is possible to secure a sufficient shake correction movable range by the second shake correction unit under exposure. This scheme enables a shake correction movable range to be always secured even immediately after a panning operation or significant camera shake, and thereby allows stable camera shake correction to be performed.

A case has been described here where the second shake correction unit is held at the center position under recording of a thru-image, but without being limited to this, it is also possible to limit the correction range of the second shake correction unit and make a correction under exposure for a thru-image.

For example, under recording of a thru-image, the first shake correction unit performs shake correction, and at the same time, the second shake correction unit performs shake correction within a set correction range (e.g., 0.15 degrees), whereas under exposure for a still image, the correction range of the second shake correction unit is expanded (e.g., 0.4 degrees) to secure the correction range under exposure.

Thus, by limiting the movable range under recording of a thru-image and performing a shake correction in the second shake correction unit as well, it is possible to secure a shake correction range under exposure while improving the shake correction effect under recording of a thru-image and improving the appearance. At this time, the correction range of the second shake correction unit under recording of a thru-image is set so as to be able to secure a sufficient correction range under exposure.

Moreover, the resolution of detecting the position of the second shake correction unit used under exposure is set to be higher than the resolution of detecting the position of the first shake correction unit used under recording of a thru-image. It is thereby possible to make more accurate camera shake correction. Here, if the resolution of detecting the position is increased, the movable range becomes narrower, and it is therefore preferable to set the resolution of detecting the position so as enable a movable range required for hand-held photographing to be secured. (For example, the first shake correction movable range is set to 1.2 degrees for recording of a thru-image at the time of the telephoto-end and the second shake correction angle is set to 0.4 degrees for a still image exposure.)

[Embodiment 2]

Next, an image pickup apparatus according to Embodiment 2 of the present invention will be described. The configuration of the image pickup apparatus according to Embodiment 2 is the same as that of Embodiment 1. In Embodiment 2, only parts different from those in Embodiment 1 will be described.

Embodiment 2 will describe driving of a shake correction unit at the time when a moving image is recorded and when a still image is recorded under recording of a moving image.

Figure 7:
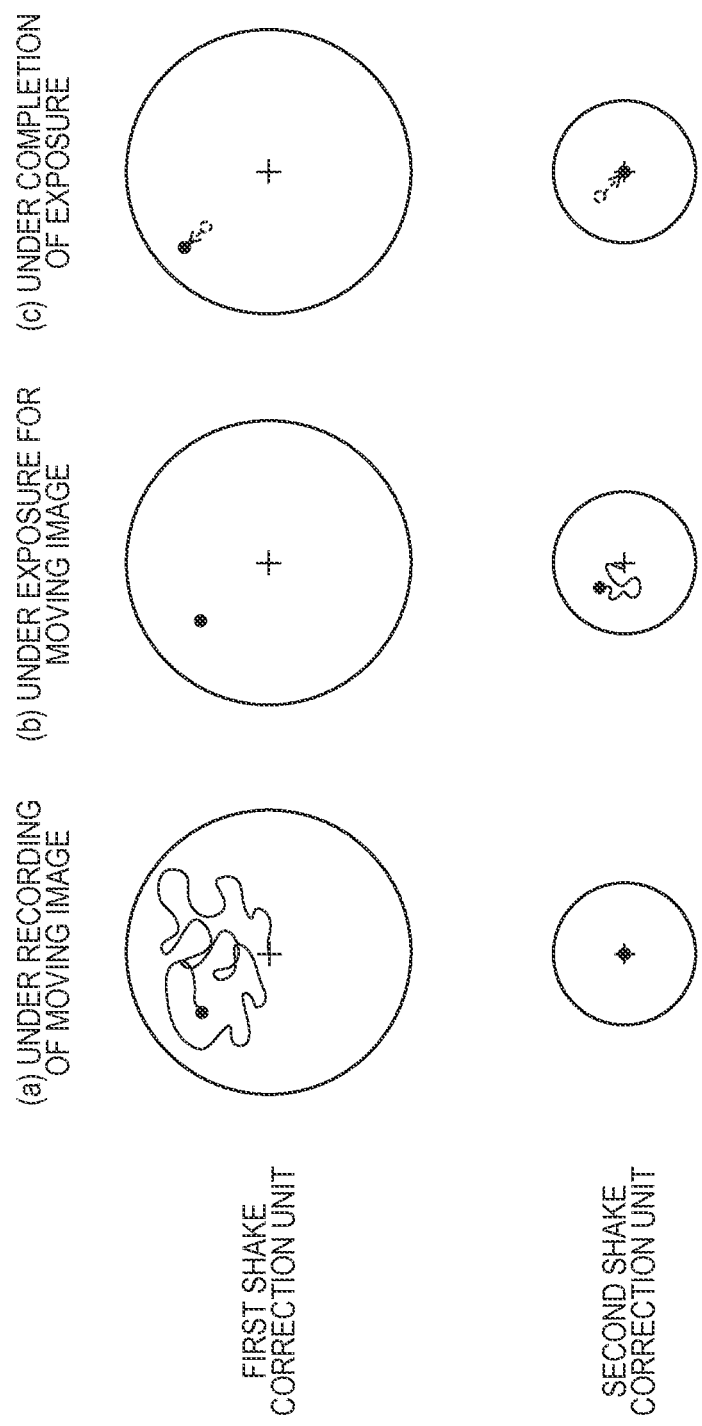
FIG. 7 illustrates operations of the first shake correction unit and the second shake correction unit when a still image is obtained under recording of a moving image according to each embodiment of the present invention. (a) of FIG. 7 illustrates a state of the shake correction unit under recording of a moving image, (b) of FIG. 7 illustrates a state of the shake correction unit under exposure for a moving image and under recording of a still image, and (c) of FIG. 7 illustrates a state of the shake correction unit under exposure for a moving image and under completion of exposure for recording of a still image.

In (a) of FIG. 7, it is illustrated, a state of the shake correction unit (optical correction unit) at the time when a moving image is recorded. A shake-proof process is performed by driving only the first shake correction unit under recording of a moving image. That is, for all the shake correction angles calculated by the shake correction angle calculation unit 306, target positions are calculated in the first and second shake correction target position calculation unit 307 as the amount of drive of the first shake correction unit. In this case, the second shake correction unit is held at the center position of the movable range which is a predetermined position. The position of the second shake correction unit is held as position data in the second shake correction position holding unit 311.

In (b) of FIG. 7, it is illustrated, a state of the shake correction unit at the time when a still image is recording under recording a moving image. The moment at which the SW2 is notified from the release information notification unit 309 and an exposure is started, the first shake correction unit is stopped and the position thereof is held at that place at which it is stopped. For the shake correction angle calculated by the shake correction angle calculation unit 306, the first and second shake correction target position calculation unit 307 calculates, using the moment at which the SW2 is pressed as a reference, target positions as the amount of drive of the second shake correction unit so that only a correction angle from the reference is corrected. The stop position of the first shake correction unit at this time is held by the first shake correction position holding unit 310.

Figure 8:
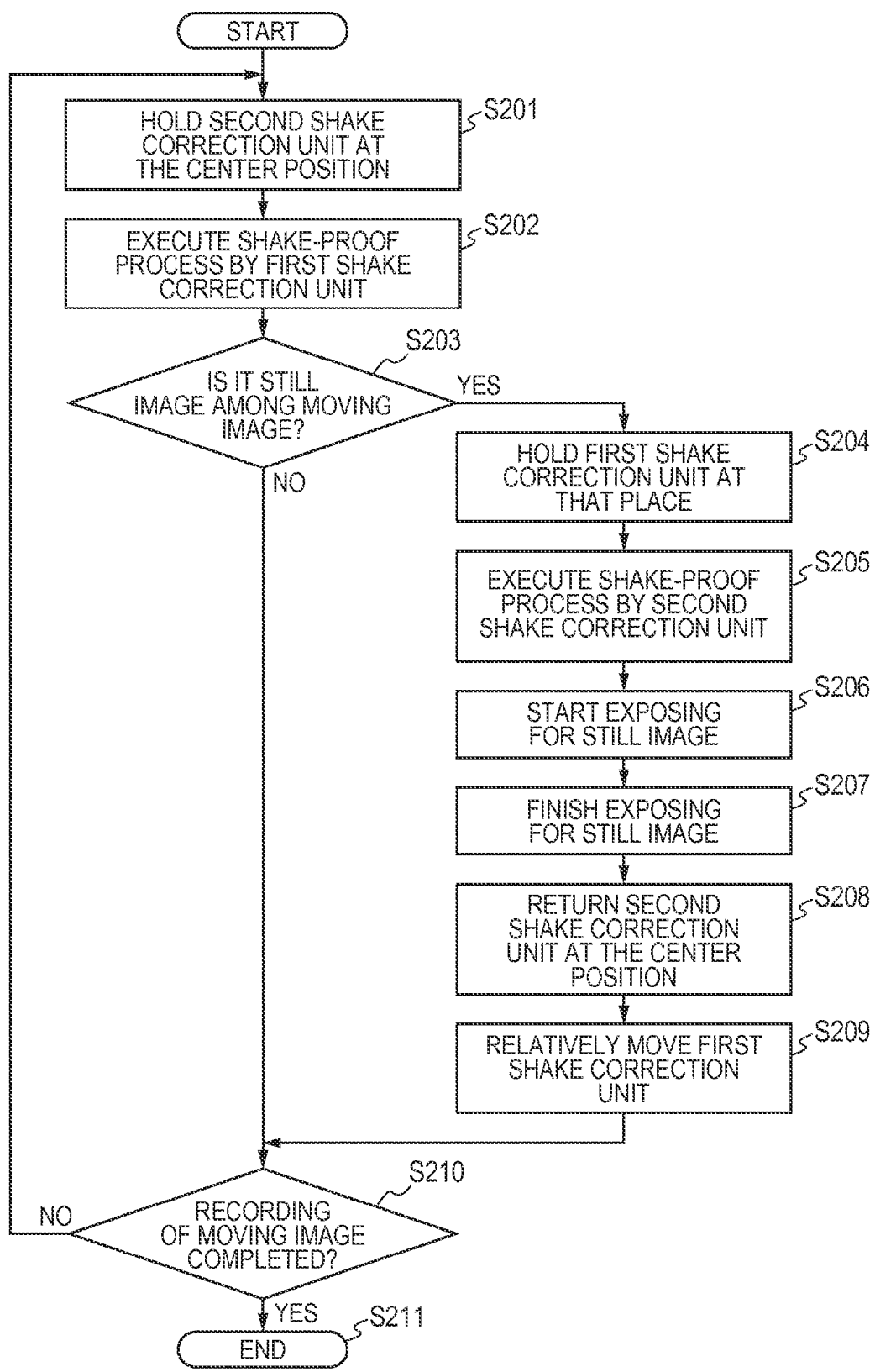
FIG. 8 is a flowchart when a still image is obtained under recording of a moving image according to each embodiment of the present invention.

In (c) of FIG. 7, it is illustrated, a state of the shake correction unit at the time when exposure for recording a still image is completed under recording of a moving image. After completion of exposure, under recording of a moving image and under recording of a still image, the second shake correction unit returns to the center position for the next exposure. Recording of a moving image is performed continuously. At this time, movement from the position under completion of exposure to the center position causes the angle of view to be deviated, and therefore the first shake correction unit is moved from the stop position where the first shake correction unit is held by the first shake correction position holding unit 310 in a direction in which the deviation of the angle of view is canceled. At the same time, the shake correction angle calculated by the shake correction angle calculation unit 306 is switched so as to drive the first shake correction unit based on the reference determined in (b) of FIG. 7. A flowchart in FIG. 8 illustrates these processes.

After the camera is started, under recording of a moving image, the second shake correction unit is held at the center position (S201) and shake-proof control is performed by only the first shake correction unit (S202). Next, under exposure for a moving image for recording (photographing) of a still image, it is determined whether or not the release switch SW2 has been pressed (S203). When the SW2 has not been pressed, a moving image is recorded using the first shake correction unit and the flow proceeds to S210. On the other hand, when the SW2 is pressed, recording of a moving image is in progress and recording (photographing) of a still image has been started, the first shake correction unit is fixed at that place at the same time as the SW2 is pressed (S204). Under recording of a moving image, the second shake correction unit which has been fixed at the center position performs a shake-proof process (S205). Exposure of a still image is started (S206), the exposure for recording of a still image is completed after a lapse of a predetermined time, and recording (photographing) of a still image under recording of a moving image is processed (S207). Thus, before exposure for recording of a still image (under recording of a moving image) under recording of a moving image, the second shake correction unit is fixed at the center position which is the position at which exposure for recording of a still image under recording of a moving image is started. By performing a shake-proof process simultaneously with the start of exposure for recording of a still image under recording of a moving image, it is possible to secure a sufficient shake-proof movable range for exposure for recording of a still image under recording of a moving image.

After completion of exposure for recording of a still image under recording of a moving image, the second shake correction unit is returned to the center position which is the position at which the second shake correction unit has been held under recording of a moving image (S208). At the same time, since the angle of view is deviated by an amount the second shake correction unit is returned to the center position, the first shake unit is moved so as to cancel out the amount corresponding to the deviation of the angle of view (S209). Thus, by moving the first camera shake correction unit so as to cancel out the deviation of the angle of view, it is possible to prevent any deviation of the angle of view from occurring unnaturally after completion of exposure and at the same time prepare for the next recording (photographing) of a still image under recording of a moving image. After recording (photographing) of a still image under recording of a moving image is completed, the flow returns to the moving image recording state again. It is determined whether or not recording of a moving image is completed (S210), and if recording of a moving image is not completed, the flow returns to the state in S201. If the shake-proof process is completed, both the first shake correction unit and the second shake correction unit are returned to the center position and held in that state.

As described above, by switching driving of the first and second shake correction units under recording of a moving image and under exposure for a moving image, it is possible to secure a sufficient shake correction movable range by the second shake correction unit for recording of a still image under exposure for a moving image. Using this scheme, it is possible to always secure the shake correction movable range even immediately after large camera shake such as panning operation or photographing while walking around, and thereby execute stable camera shake correction for recording of a still image under exposure for a moving image.

[Embodiment 3]

Next, an image pickup apparatus according to Embodiment 3 of the present invention will be described. The configuration of the image pickup apparatus according to Embodiment 3 is the same as the configuration of the image pickup apparatus according to Embodiment 1. In Embodiment 3, only differences from Embodiment 1 will be described.

Figure 9:
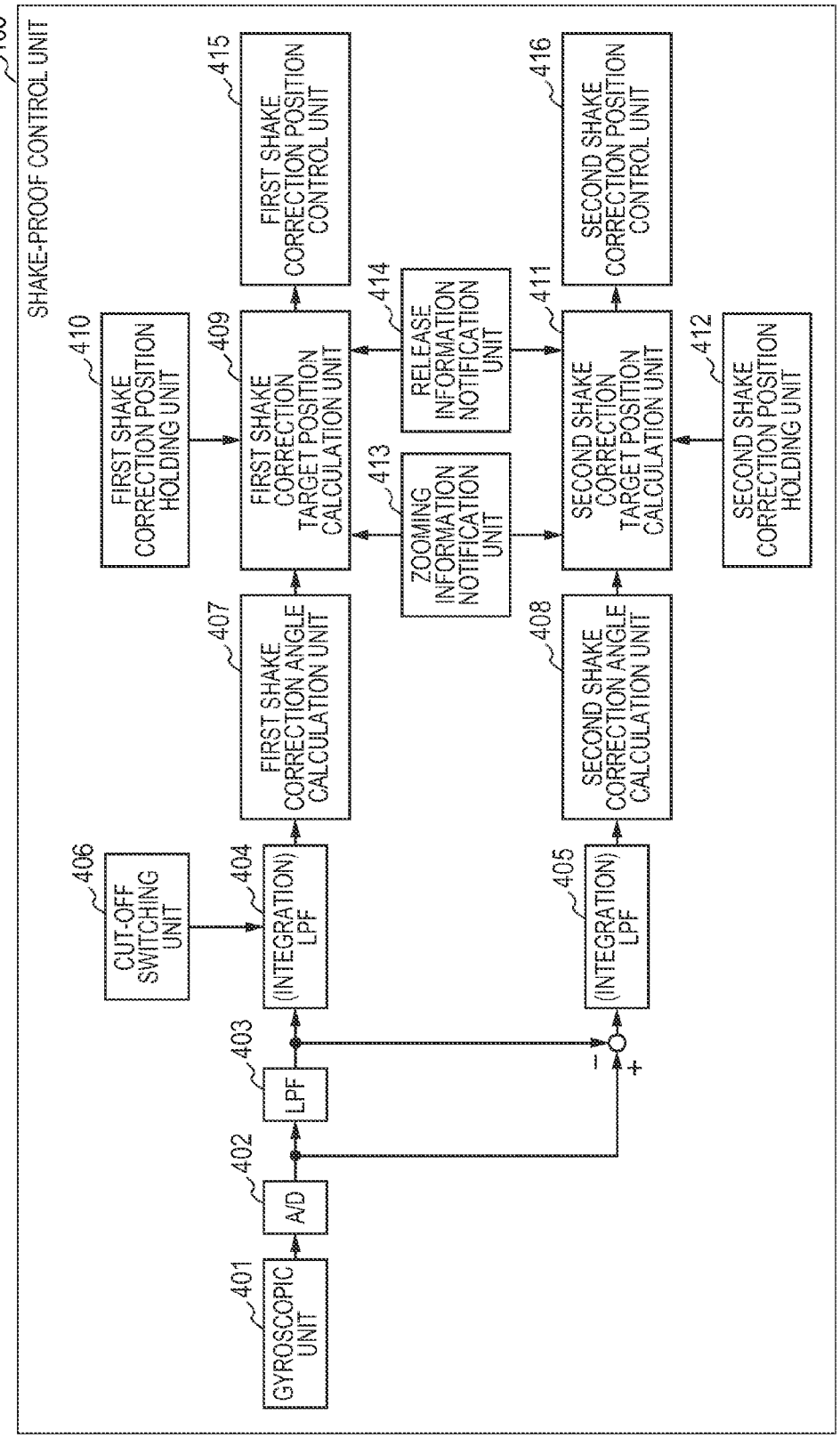
FIG. 9 is a block diagram describing an internal configuration of a shake-proof control unit according to Embodiment 3 of the present invention.

Embodiment 3 will describe a case where when switching driving of the first shake correction unit (the first optical correction unit) and the second shake correction unit (the second optical correction unit) under recording of a thru-image and under exposure for a still image, only the second shake correction unit is driven under recording of a thru-image and both the first shake correction unit and the second shake correction unit are driven under exposure for a still image. FIG. 9 illustrates a block diagram showing a configuration of a shake-proof control unit according to Embodiment 3.

Only a low frequency component of a signal output from an AD converter 402 is extracted by an LPF 403. The low frequency camera shake signal extracted by the LPF 403 is used in an LPF 404 for panning control that suppresses correction output according to the magnitude of the shake correction angle and shift lens position or the like, and also subjected to integration processing and a shake angle signal whose only low frequency component is extracted is generated. The output signal of the LPF 404 is input to a first shake correction angle calculation unit 407, and the output thereof is input to a first shake correction calculation unit 409 which is a target position calculation unit where an angle to be corrected is calculated.

On the other hand, a high frequency component is extracted from the camera shake signal by subtracting the low frequency component extracted in the LPF 403 from the signal output from the AD converter 402. The high frequency camera shake signal extracted through the subtraction is subjected to integration processing in an LPF 405 and a shake angle signal whose only high frequency component is extracted is generated. The output signal of the LPF 405 is input to a second shake correction angle calculation unit 408 and the output thereof is input to a second shake correction calculation unit 411 which is a target position calculation unit where the angle to be corrected is calculated. Here, in Embodiment 3, only the high frequency signal processed in the LPF 405 extracted and generated as a shake angle signal is subjected to a shake-proof process under recording of a thru-image. Under exposure for a still image, both the camera shake signal of the high frequency component and the camera shake signal of the low frequency component processed in the LPF 404 are subjected to the shake-proof process.

Figure 10:
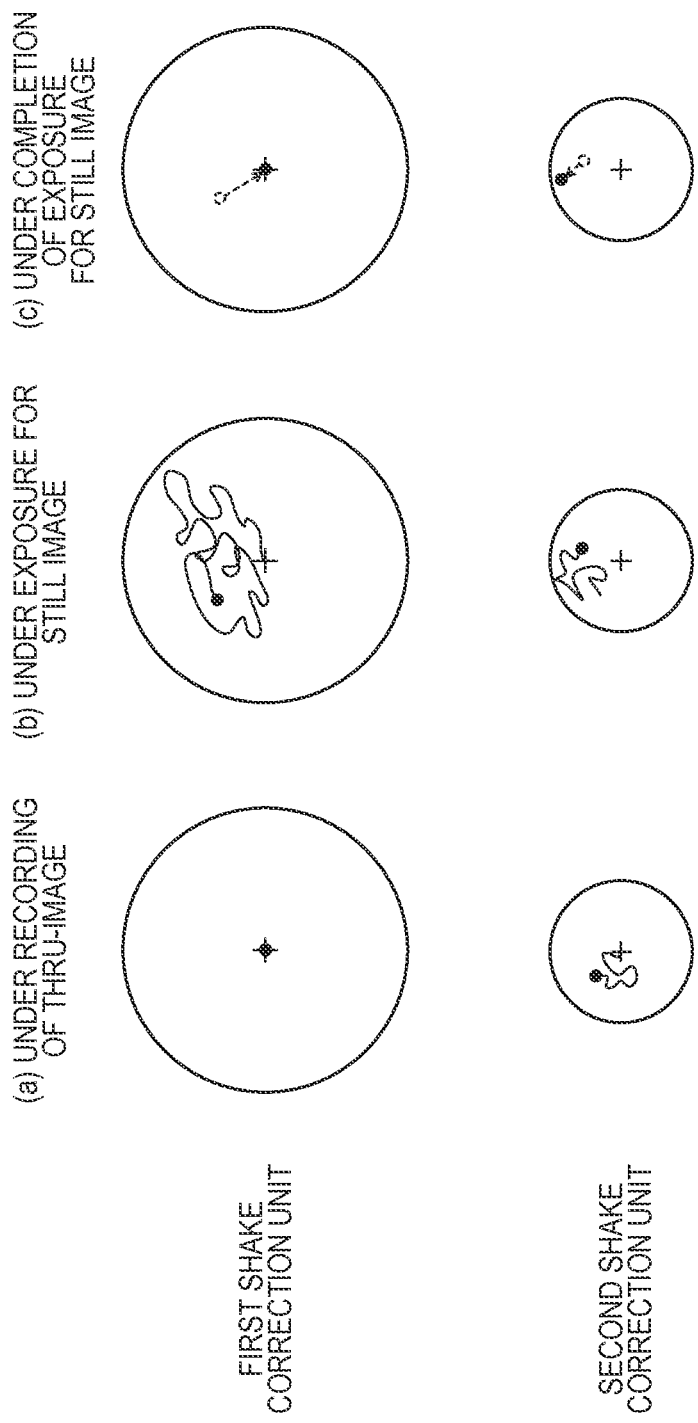
FIG. 10 illustrates operations of the first shake correction unit and the second shake correction unit when a still image is obtained according to Embodiment 3 of the present invention.

Such a situation is shown in FIG. 10.

In (a) of FIG. 10, it is illustrated, states of the first shake correction unit and the second shake correction unit under recording of a thru-image. Under recording of a thru-image, only the second shake correction unit is driven to execute the shake-proof process. That is, only the high frequency side is extracted and the shake correction angle calculated by the shake correction angle calculation unit 408 is calculated by the second shake correction calculation unit 411 as a target position. Low frequency large shake is not corrected under recording of a thru-image and only small high frequency shake is subjected to the shake-proof process to thereby improve the appearance. Under recording of a thru-image, the first shake correction unit is held at the center position of the movable range which is a predetermined position and held in such a state. The position information of the first shake correction unit at this time is held in a first shake correction position holding unit 410 as position data.

In (b) of FIG. 10, it is illustrated, a state of the shake correction unit under exposure for a still image. At the moment at which the SW2 is notified from a release information notification unit 413 and exposure is started, the first shake correction unit starts driving. The shake correction angle calculated by the shake correction angle calculation unit 407 is calculated, using the moment at which the SW2 is pressed as a reference, by the first shake correction calculation unit 409 as the amount of drive of the first shake correction unit so that only a correction angle from the reference is corrected as a target position. As for the second shake correction unit, the shake correction angle calculated in the second shake correction angle calculation unit is calculated by the second shake correction calculation unit 411 as a target position as in the case of a thru-image.

In (c) of FIG. 10, it is illustrated, states of the first shake correction unit and the second shake correction unit under completion of exposure for a still image. After completion of exposure, the first shake correction unit returns to the center position for the next exposure of a still image. At this time, the first shake correction unit moves from the position when exposure is completed to the center position, and the angle of view is thereby deviated. Thus, the second shake correction unit is moved in a direction in which the deviation of the angle of view is canceled. At the same time, the shake correction angle calculated by the first shake correction angle calculation unit 407 is switched based on the reference defined in (b) of FIG. 10 by driving the first shake correction unit so as to hold the first shake correction unit at the position when exposure is started. These processes are shown in a flowchart in FIG. 11.

In a state after the camera is started, when camera shake correction is on and under recording of a thru-image, the first shake correction unit is held at the center position (S301). Then, shake-proof control is performed by only the second shake correction unit (S302). Next, it is determined whether or not the release switch SW2 has been pressed (S303). When the SW2 has not been pressed, the flow proceeds to S310 under recording of a thru-image while performing shake correction by the second shake correction unit. On the other hand, when the SW2 is pressed and still image photographing has been started, driving of the first shake correction unit is started simultaneously with the pressing of the SW2 (S304). Then, both the first shake correction unit and the second shake correction unit are simultaneously driven to execute a shake-proof process (S305). Exposure starts (S306), the exposure is completed after a lapse of a predetermined time and still image photographing is processed (S307). In this way, the first shake correction unit is fixed at the center before exposure, both the first shake correction unit and the second shake correction unit are subjected to the shake-proof process simultaneously with the start of exposure, and it is thereby possible to secure a sufficient shake-proof movable range under exposure.

Under completion of exposure, the first shake correction unit is returned to the center position at which the first shake correction unit has been held under recording of a thru-image (S308), and the second shake correction unit is simultaneously returned to thereby move the second shake correction unit so as to cancel the changed angle of view (S309).

By moving the second camera shake correction unit so as to cancel out the deviation of the angle of view in this way, it is possible to prepare for the next photographing while being able to prevent the angle of view from being unnaturally deviated after completion of exposure. After completion of still image photographing, the flow returns to the state under recording of a thru-image, it is determined whether or not the shake-proof process is finished (S310), and the flow returns to the state in S301 when the shake-proof process is not finished. When the shake-proof process is finished, both the first shake correction unit and the second shake correction unit are returned to the center position and held in that state.

The image pickup apparatus has been described in the present embodiment, and the present invention is also applicable to a lens barrel as an optical device mountable on the image pickup apparatus of the present invention, and the optical device mountable on the image pickup apparatus of the present invention also falls within the scope of the present invention. Therefore, the lens barrel having a configuration similar to that of the present embodiment also constitutes one aspect of the present invention. The present invention is not limited to these embodiments, but various modifications and alterations can be made without departing from the scope of the gist of the present invention such as driving the second shake correction unit at the moment at which the SW1 is pressed.

In Embodiment 2 and Embodiment 3, the resolution of detecting the position of the second shake-proof unit is set to be higher than the resolution of detecting the position of the first shake correction unit. Since the movable range becomes smaller by increasing the resolution of detecting the position in this embodiment as well, it is preferable to set the resolution so as to be able to secure a portion corresponding to the movable range necessary in hand-held photographing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-262415, filed Dec. 19, 2013, and Japanese Patent Application No. 2014-252723, filed Dec. 15, 2014, which are hereby incorporated by reference herein in their entirety.

What is claimed is:

1. A shake correction apparatus, comprising:
a shake detector configured to detect shaking;
a first optical correction device and a second optical correction device configured to optically perform image shake correction using shake signals output from the shake detector; and
a controller configured to control at least one of the first optical correction device or the second optical correction device to perform image shake correction,
wherein when a still image photographing operation is not performed, the controller controls a correction range of image shake correction of the second optical correction device to be narrower than a predetermined value, and
wherein when the still image photographing operation is performed, the controller controls the correction range of image shake correction of the second optical correction device to be wider than the predetermined value.

2. A shake correction apparatus according to claim 1, wherein when the still image photographing operation is not performed, the controller controls the second optical correction device to be hold at a predetermined position of the correction range of image shake correction.

3. A shake correction apparatus according to claim 2, wherein the first shake correction device performs the image shake correction when the second shake correction device is held at the predetermined position.

4. A shake correction apparatus according to claim 1, wherein during performing the still image photographing operation, the first optical correction device is held at a position at which the still image photographing operation starts.

5. A shake correction apparatus according to claim 1, wherein resolution relating to a position of the second optical correction device is higher than resolution relating to a position of the first optical correction device.

6. A shake correction apparatus according to claim 1,
wherein when moving images are displayed on a display, the controller controls the correction range of image shake correction of the second optical correction device to be narrower than the predetermined value.

7. A shake correction apparatus according to claim 6, further comprising;
an image sensor configured to receive incident light that passes through the first optical correction device and the second optical correction device.

8. A shake correction apparatus according to claim 1 further comprising;
an image sensor configured to receive incident light that passes through the first optical correction device and the second optical correction device.

9. A shake correction apparatus according to claim 1, wherein
an optical unit including the first optical correction device and the second optical correction device are detachable from the shake correction apparatus.

10. A shake correction apparatus according to claim 1,
wherein when the still image photographing operation is not performed, the controller controls that the correction range of image shake correction of the first optical correction device is wider than a predetermined range.

11. A shake correction apparatus according to claim 1,
wherein when the still image photographing operation is performed, the controller controls that the correction range of image shake correction of the first optical correction device is narrower than a predetermined range.

12. A shake correction apparatus according to claim 1,
wherein before still image photographing operation, the controller controls that the correction range of image shake correction of the second optical correction device is narrower than the predetermined value.

13. A shake correction apparatus according to claim 1,
wherein before still image photographing operation, the controller controls that the correction range of image shake correction of the first optical correction device is wider than a predetermined range.

14. A shake correction apparatus according to claim 1, wherein before the still image photographing operation, the controller controls that the second optical correction device is held at a predetermined position of the correction range of image shake correction.

15. A shake correction apparatus according to claim 1,
wherein when a moving images are displayed on a display, the correction range of image shake correction of the first optical correction device is wider than a predetermined range.

16. A shake correction method comprising:
detecting shaking;
controlling a first optical correction device and a second optical correction device configured to optically perform shake correction using shake signals acquired in the shake detection; and
performing control controlling such that at least one of the first optical correction device or the second optical correction device performs image shake correction,
wherein when a still image photographing operation is not performed, the controlling includes collecting a correction range of image shake correction of the second optical correction device to be narrower than a predetermined value, and
wherein when the still image photographing operation is performed, the controlling includes controlling the correction range of image shake correction of the second optical correction device to be wider than the predetermined value.

* * * * *